United States Patent
Noorizadeh et al.

(10) Patent No.: US 11,302,327 B2
(45) Date of Patent: Apr. 12, 2022

(54) PRIORI KNOWLEDGE, CANONICAL DATA FORMS, AND PRELIMINARY ENTRENTROPY REDUCTION FOR IVR

(71) Applicant: Bank of America Corporation, Charlotte, NC (US)

(72) Inventors: Emad Noorizadeh, Plano, TX (US); Ramakrishna R. Yannam, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 135 days.

(21) Appl. No.: 16/907,412

(22) Filed: Jun. 22, 2020

(65) Prior Publication Data
US 2021/0398526 A1  Dec. 23, 2021

(51) Int. Cl.
G10L 15/22 (2006.01)
G10L 15/00 (2013.01)
G10L 15/18 (2013.01)
G06N 3/04 (2006.01)

(52) U.S. Cl.
CPC ............ G10L 15/22 (2013.01); G06N 3/0445 (2013.01); G10L 15/005 (2013.01); G10L 15/1822 (2013.01)

(58) Field of Classification Search
CPC ... G10L 15/22; G10L 15/005; G10L 15/1822; G06N 3/0445
USPC ....................................................... 704/251
See application file for complete search history.

(56) References Cited

U.S. PATENT DOCUMENTS

| | | | | |
|---|---|---|---|---|
| 6,385,579 B1* | 5/2002 | Padmanabhan | ....... | G10L 15/063 704/243 |
| 8,515,758 B2* | 8/2013 | Huo | ........................ | G10L 15/02 704/251 |
| 9,812,151 B1* | 11/2017 | Amini | ..................... | G06V 20/40 |
| 2006/0100855 A1* | 5/2006 | Rozen | ..................... | G06F 40/35 704/9 |
| 2006/0161534 A1* | 7/2006 | Carson | ................... | G06F 16/951 |
| 2006/0195460 A1* | 8/2006 | Nori | ....................... | G06F 16/252 |
| 2006/0195476 A1* | 8/2006 | Nori | ....................... | G06F 16/289 |
| 2006/0253410 A1* | 11/2006 | Nayak | ...................... | G06F 16/35 |
| 2007/0005566 A1* | 1/2007 | Bobick | ................. | G06F 40/247 |
| 2007/0055692 A1* | 3/2007 | Pizzo | ..................... | G06F 16/289 |
| 2007/0219976 A1* | 9/2007 | Muralidhar | ............. | G06F 16/84 |
| 2007/0250492 A1* | 10/2007 | Angel | ................ | G06F 16/90324 |
| 2008/0147627 A1* | 6/2008 | Natkovich | .......... | G06F 16/2454 707/E17.05 |
| 2009/0157651 A1* | 6/2009 | Tomkins | ............... | G06F 16/951 707/999.005 |

(Continued)

Primary Examiner — Thuykhanh Le
(74) Attorney, Agent, or Firm — Weiss & Arons LLP

(57) ABSTRACT

Apparatus and methods for interactive voice recognition. The apparatus and methods may include a canonical phrase derivation engine configured to derive canonical phrases from voice data. The apparatus may include an input engine configured to parse utterances. The apparatus may include a knowledge extraction engine to disambiguate the utterances into words, form a sequence from the words, extract context from the sequence, pair the sequence with a phrase of the canonical phrases, merge the sequence and the phrase to form a hybrid phrase, vectorize the hybrid phrase into a vector, and feed the vector into a non-linear classification engine to determine an intent corresponding to the utterances.

20 Claims, 15 Drawing Sheets

(56) References Cited

U.S. PATENT DOCUMENTS

| | | | |
|---|---|---|---|
| 2009/0258333 A1* | 10/2009 | Yu | G09B 19/06 434/157 |
| 2011/0078105 A1* | 3/2011 | Wallace | G06N 5/047 707/E17.014 |
| 2011/0129153 A1* | 6/2011 | Petrou | G06V 30/418 382/182 |
| 2012/0036162 A1* | 2/2012 | Gimbel | G06F 16/2455 707/783 |
| 2012/0150835 A1* | 6/2012 | Bobick | G06F 16/24575 707/706 |
| 2013/0166279 A1* | 6/2013 | Dines | G10L 15/063 704/8 |
| 2013/0191126 A1* | 7/2013 | Thambiratnam | G10L 15/187 704/245 |
| 2013/0290318 A1* | 10/2013 | Shapira | G06F 16/2465 707/723 |
| 2014/0280259 A1* | 9/2014 | McGillin | G06F 16/2452 707/756 |
| 2015/0269175 A1* | 9/2015 | Espenshade | G06F 16/90324 706/47 |
| 2016/0148119 A1* | 5/2016 | Hsu | G06F 40/279 706/12 |
| 2016/0267142 A1* | 9/2016 | Cafarella | G06F 16/24568 |
| 2017/0076718 A1* | 3/2017 | Popovici | G10L 15/02 |
| 2018/0285170 A1* | 10/2018 | Gamon | G06F 9/541 |
| 2018/0308470 A1* | 10/2018 | Park | G10L 15/063 |
| 2019/0080225 A1* | 3/2019 | Agarwal | G06F 16/35 |
| 2019/0295531 A1* | 9/2019 | Rao | G10L 15/187 |
| 2019/0370615 A1* | 12/2019 | Murphy | G06Q 10/0633 |
| 2019/0385253 A1* | 12/2019 | Vacek | G06Q 50/18 |
| 2020/0050940 A1* | 2/2020 | Li | G06F 16/953 |
| 2020/0065344 A1* | 2/2020 | Bobick | G06F 16/3332 |
| 2020/0089758 A1* | 3/2020 | Reddi | G06F 40/242 |
| 2020/0111487 A1* | 4/2020 | Sanganabhatla | G06F 3/167 |
| 2020/0151277 A1* | 5/2020 | Fisher | G06T 17/00 |
| 2020/0193992 A1* | 6/2020 | Kim | G10L 25/84 |
| 2020/0226475 A1* | 7/2020 | Ma | G06N 3/0454 |
| 2020/0285353 A1* | 9/2020 | Rezazadeh Sereshkeh | G06F 3/167 |
| 2020/0327506 A1* | 10/2020 | Litman | G06Q 10/1053 |
| 2020/0349464 A1* | 11/2020 | Lin | G06N 3/084 |
| 2020/0357392 A1* | 11/2020 | Zhou | G10L 15/1822 |
| 2020/0394551 A1* | 12/2020 | Rao | G06F 21/6227 |
| 2021/0004543 A1* | 1/2021 | Kobayashi | G10L 15/02 |
| 2021/0081498 A1* | 3/2021 | Goslin | G06K 9/6263 |
| 2021/0089934 A1* | 3/2021 | Thornley | G06N 5/04 |
| 2021/0097994 A1* | 4/2021 | Liu | G10L 15/08 |
| 2021/0109703 A1* | 4/2021 | Kim | H04M 1/725 |
| 2021/0118449 A1* | 4/2021 | Kim | G10L 15/32 |
| 2021/0151046 A1* | 5/2021 | Nicholson | G10L 25/63 |
| 2021/0216862 A1* | 7/2021 | Liu | G06N 3/0454 |
| 2021/0264804 A1* | 8/2021 | Venkatasubramanyam | G10L 13/00 |
| 2021/0383810 A1* | 12/2021 | Camenares | G10L 15/1822 |

* cited by examiner

IVR Enunciator ⟶ 502

"How can I help you today?"

IVR Receiver ⟶ 504

"I want to check my account."

Input Engine ⟶ 506

$w_1$ "I"

$w_2$ "want"

$w_3$ "to"

$w_4$ "check"

$w_5$ "my"

$w_6$ "account"

FIG. 5

IVR Enunciator — 802

"Would that be for consumer accounts or advisory services?"

IVR Receiver — 804

"Consumer accounts"

Input Engine — 806

$w_1$ *"Consumer"*

$w_2$ *"accounts"*

FIG. 8

IVR Enunciator ╱─1002

"Would that be for a regular account or a brokerage account?"

IVR Receiver ╱─1004

"Regular"

Input Engine ╱─1006

$w_k$ "Regular"

FIG. 10

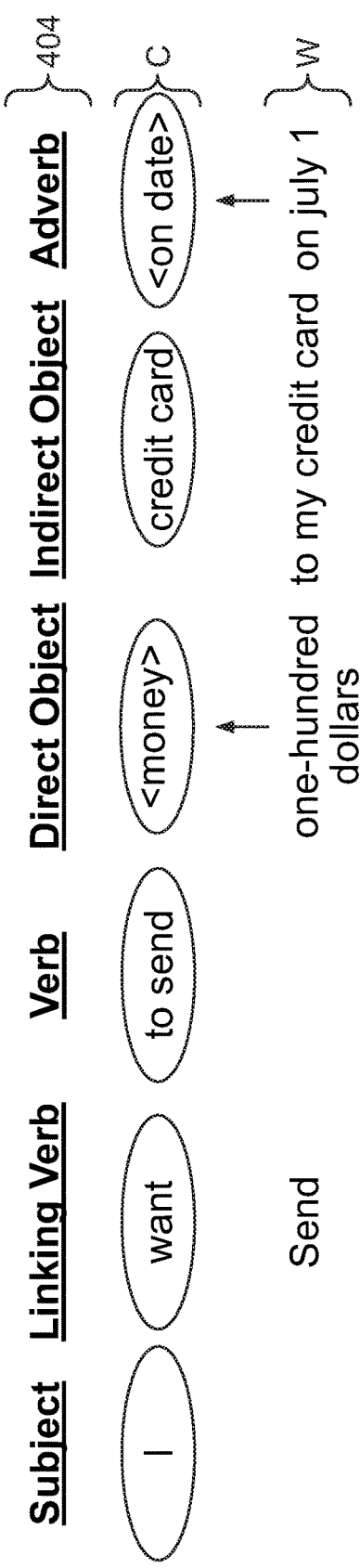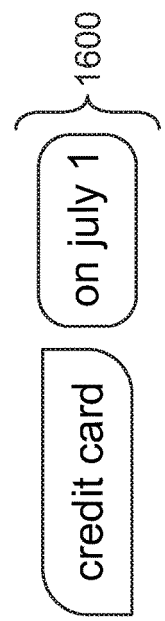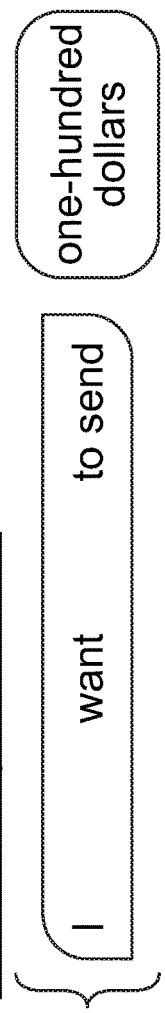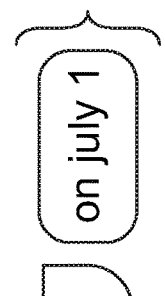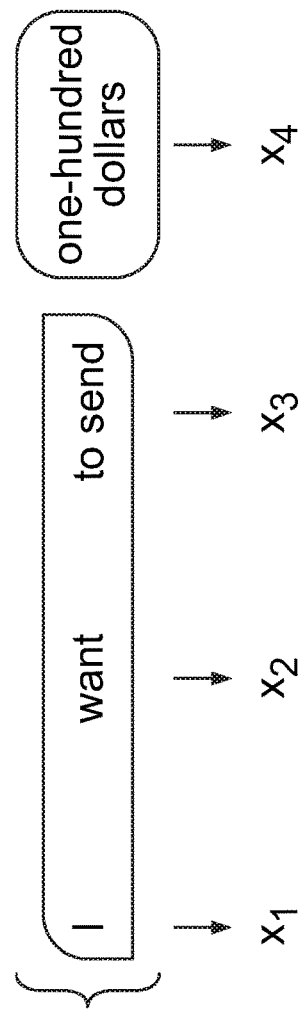

PRIORI KNOWLEDGE, CANONICAL DATA FORMS, AND PRELIMINARY ENTRENTROPY REDUCTION FOR IVR

BACKGROUND

Typical interactive voice recognition ("IVR") systems use non-linear classification systems to derive intent from a sequence of utterances. Deep learning has been applied to the classification systems to improve accuracy of intent prediction. IVR systems are still in need of improved intent prediction accuracy, because when accuracy is low, customer experience and resource efficiency may be compromised.

Therefore, it would be desirable to provide apparatus and methods for improving IVR accuracy.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 5 shows illustrative steps of processes in accordance with principles of the invention.

FIG. 8 shows illustrative steps of processes in accordance with principles of the invention.

FIG. 10 shows illustrative steps of processes in accordance with principles of the invention.

FIG. 15 shows illustrative information in accordance with principles of the invention.

FIG. 16 shows illustrative information in accordance with principles of the invention.

FIG. 17 shows illustrative information in accordance with principles of the invention.

DETAILED DESCRIPTION

Figure 1:
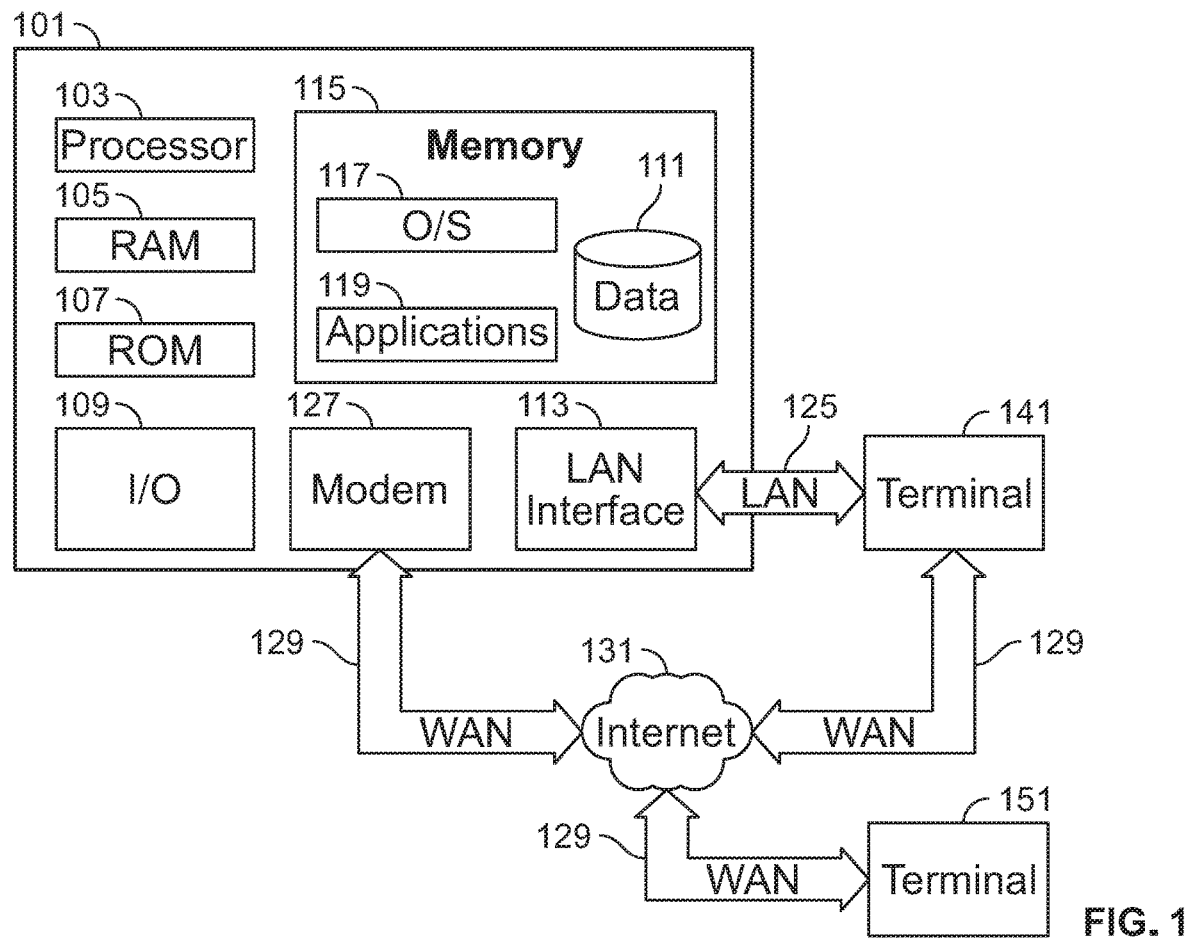
FIG. 1 shows illustrative apparatus that may be used in accordance with principles of the invention.

Apparatus and methods for interactive voice recognition are provided.

The apparatus and methods may include a canonical phrase derivation engine configured to derive canonical phrases from voice data.

The apparatus may include an input engine configured to parse utterances. The apparatus may include a knowledge extraction engine. The knowledge extraction engine may be configured to disambiguate the utterances into words. The knowledge extraction engine may be configured to form a sequence from the words. The knowledge extraction engine may be configured to extract context from the sequence. The knowledge extraction engine may be configured to pair the sequence with a phrase of the canonical phrases. The knowledge extraction engine may be configured to merge the sequence and the phrase to form a hybrid phrase. The knowledge extraction engine may be configured to vectorize the hybrid phrase into a vector.

The apparatus may include a non-linear classification engine. The non-linear classification engine may be configured to embed the vector into a classifier embedding layer. The non-linear classification engine may be configured to feed output from the embedding layer into a bidirectional long short-term memory layer. The non-linear classification engine may be configured to feed output from the bidirectional long short-term memory layer into a decision layer. The non-linear classification engine may be configured to determine an intent corresponding to the utterances.

The knowledge extraction engine may be configured to generate a language dimension matrix for the words.

The language dimension matrix may be a first dimension matrix. The knowledge extraction engine may be configured to generate for each of the canonical phrases a second language dimension matrix.

The knowledge extraction engine may be configured to apply a linear model to identify the second language dimension matrix that is most similar to the first language dimension matrix. The knowledge extraction engine may be configured to select the phrase corresponding to the most similar second language dimension matrix.

The knowledge extraction engine may be configured to map a word of the sequence to an element of the phrase.

The knowledge extraction engine may be configured to, select for the hybrid phrase, from a word of the sequence and an element of phrase, either the word or the element.

The knowledge extraction engine may be configured to vectorize the hybrid phrase as input for the non-linear classification engine.

The methods may include an interactive voice recognition method that includes deriving canonical phrases from voice data. The methods may include digitally parsing utterances. The methods may include disambiguating the utterances into words. The methods may include forming a sequence from the words. The methods may include extracting context from the sequence. The methods may include pairing the sequence with a phrase of the canonical phrases. The methods may include merging the sequence and the phrase to form a hybrid phrase. The methods may include vectorizing the hybrid phrase into a vector. The methods may include embedding the vector into a classifier embedding layer. The methods may include feeding output from the embedding layer into a bidirectional long short-term memory layer. The methods may include feeding output from the bidirectional long short-term memory layer into a decision layer. The methods may include determining an intent corresponding to the utterances.

The disambiguation may include forming a language-dimension matrix corresponding to the utterances. The matrix may include a part-of-language parameter. The matrix may include a tense parameter. The matrix may include a coordinating term parameter.

The extracting may include a products and services tree.

The extracting may include a tie-breaking intervention by an automated attendant.

The pairing may include generating a language dimension matrix for the words.

The language dimension matrix is may be a first dimension matrix. The pairing may include generating for each of the canonical phrases a second language dimension matrix.

The pairing may include using a linear model to identify the second language dimension matrix that is most similar to the first language dimension matrix. The pairing may include selecting the phrase corresponding to the most similar second language dimension matrix.

The merging may include mapping a word of the sequence to an element of the phrase.

The methods may include selecting for the hybrid phrase, from a word of the sequence and an element of phrase, either the word or the element. The methods may include vectorizing the hybrid phrase.

Illustrative embodiments of apparatus and methods in accordance with the principles of the invention will now be described with reference to the accompanying drawings, which forma part hereof. It is to be understood that other embodiments maybe utilized and that structural, functional and procedural modifications or omissions may be made without departing from the scope and spirit of the present invention.

FIG. 1 is a block diagram that illustrates a computing server 101 (alternatively referred to herein as a "server or computer") that may be used in accordance with the principles of the invention. The server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of server 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, server 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and language recognition applications.

Computing server 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of one or more of a linear classification system, an input engine, a knowledge extraction engine, a non-linear classification engine and perform any other suitable tasks.

The apparatus and methods may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The apparatus and methods may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
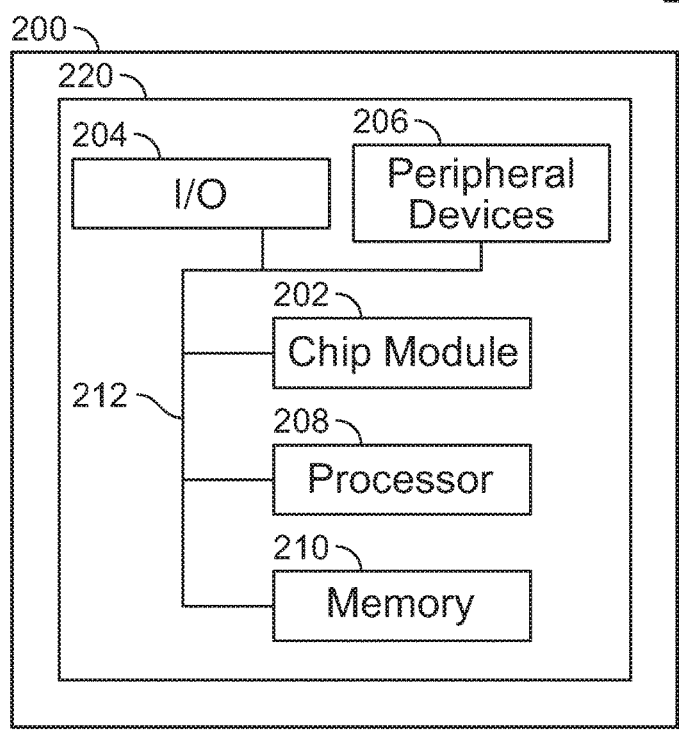
FIG. 2 shows illustrative apparatus that may be used in accordance with principles of the invention.

FIG. 2 shows illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may solve equations and perform other methods described herein; and machine-readable memory 210.

Machine-readable memory 210 may be configured to store in machine-readable data structures for utterances, words, sequences, canonical phrases, hybrid phrases, vectors, language dimension matrices and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
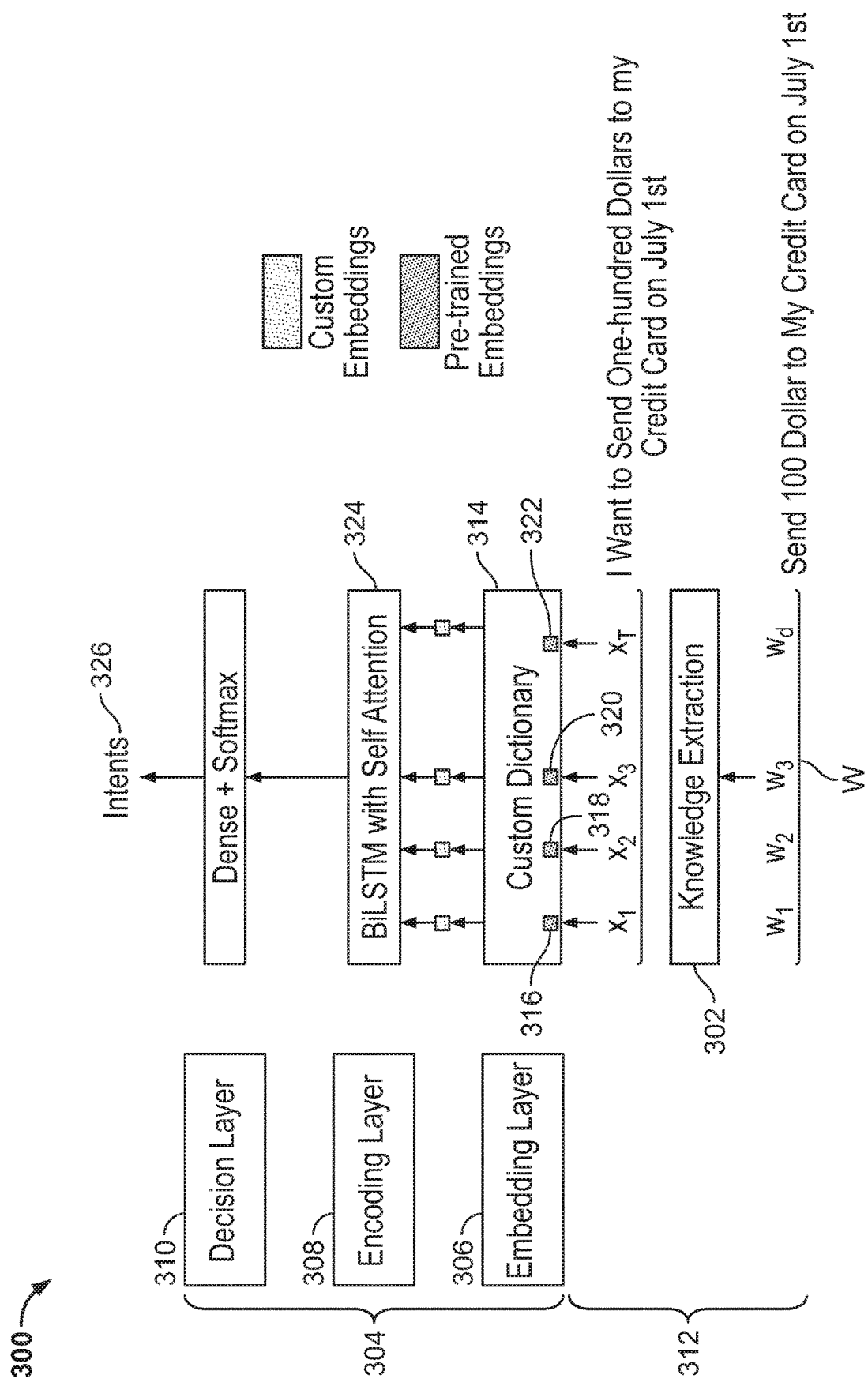
FIG. 3 shows an illustrative architecture in accordance with principles of the invention.

FIG. 3 shows illustrative architecture 300 for interactive voice recognition. Architecture 300 may include knowledge extraction engine. Architecture 300 may include non-linear classification engine 304, which may include one or more elements of a neural network. Non-linear classification engine 304 may include embedding layer 306. Non-linear classification engine 304 may include encoding layer 308. Non-linear classification engine 304 may include decision layer 310.

Architecture 300 may include accuracy enhancement stage 312. In accuracy enhancement stage 312, knowledge extraction engine 302 may receive parsed utterance sequence W. Sequence W may include parsed words $w_i$: $w_1$, $w_2, \ldots, w_d$. For example, W may include the words "send," "100," "dollars," "to," "my," "credit," "card," "on," "July," "1'." Knowledge extraction engine may merge sequence W with a canonical phrase to form vectorized hybrid phrase X. Hybrid phrase X may include parsed elements $x_i$: $x_1$, $x_2, \ldots, x_r$. For example, X may include the elements "I," "want," "to," "send," "one-hundred," "dollars," "to," "my," "credit," "card," "on," "July," "$1^{st}$."

Embedding layer 306 may embed the $x_i$ into custom dictionary 314 using custom embeddings 316, 318, 320 and 322 corresponding to respective $x_i$. Embedding layer 306 may feed custom embedding output from custom dictionary 314 to bidirectional long short-term memory module 324. Encoding layer 308 may feed output to decision layer 310. Decision layer 310 may be a dense/Softmax layer. Decision layer 310 may be encoded for different intents 326.

Figure 4:
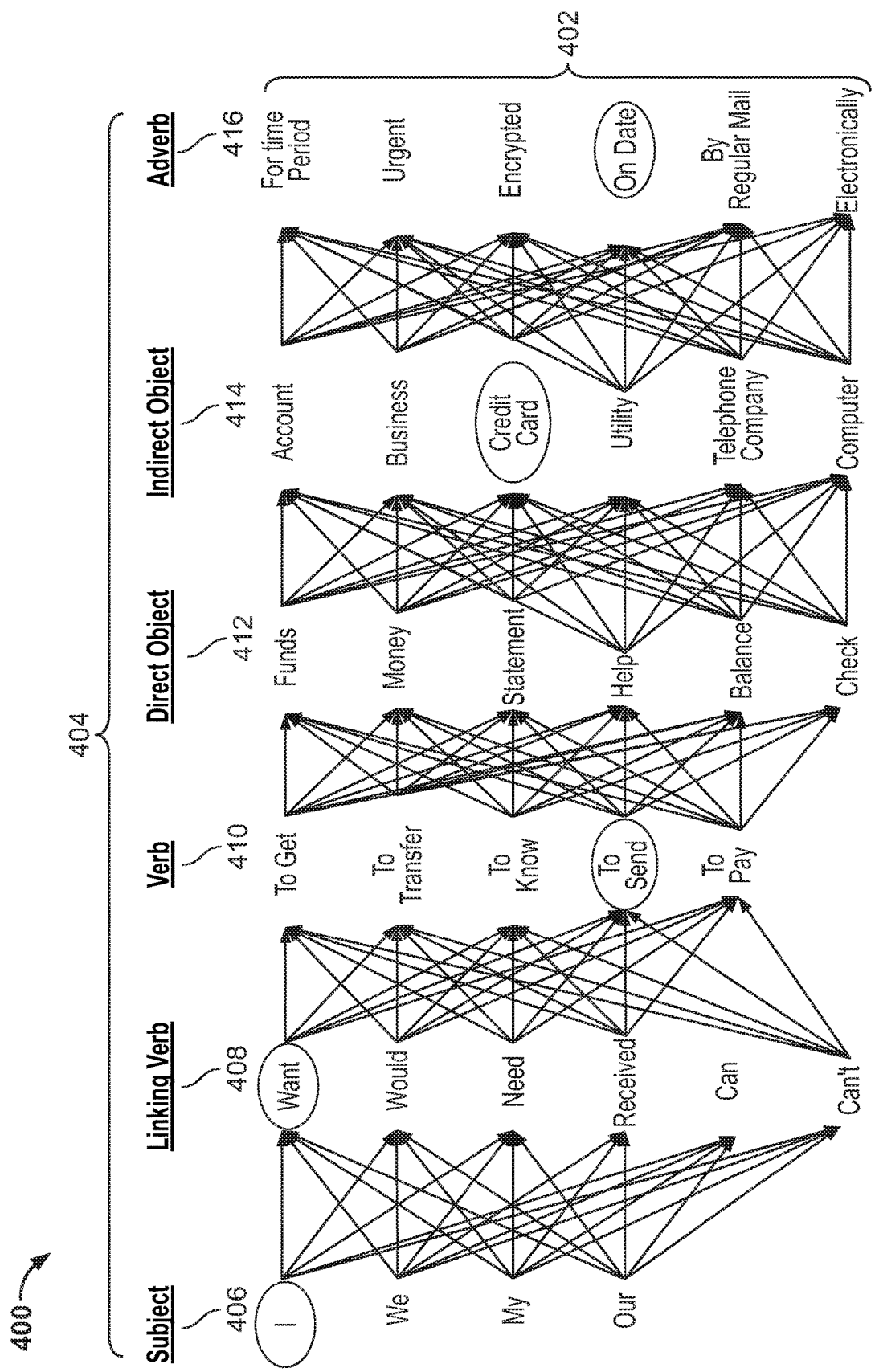
FIG. 4 shows illustrative information in accordance with principles of the invention.

FIG. 4 shows illustrative permutations 400. Permutations 400 are derived from parsed utterances 402, which correspond to sequence W (shown in FIG. 3). Permutations 400 are aligned with different parts-of-language, such as 406, 408, 410, 412, 414 and 416. The sequence of parts-of-language 406, 408, 410, 412, 414 and 416 define language standard 404. Other permutations may align with different parts of language and may define a different language standard. Other permutations may align with different sequences and may define a different language standard. The language standards may be defined based on a large data set of parsed utterances such as 402. The language standards may be used as templates to develop canonical phrases that may be used to reduce entropy associated with live utterances.

For the sake of illustration, the steps of the illustrated processes will be described as being performed by a "system." A "system" may include one or more of the features of the apparatus and schemae that are shown and described herein and/or any other suitable device or approach. The "system" may include one or more means for performing one or more of the steps described herein.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative process may include steps shown in connection with another illustrative process.

FIG. 5 shows illustrative utterance collection process 500. At step 502, an IVR enunciator may ask a customer, "HOW CAN I HELP YOU TODAY?" At step 504, an IVR receiver may receive from the customer utterances such as "I WANT TO CHECK MY ACCOUNT." At step 506, an input engine may parse the utterances into words such as $w_i$.

Figure 6:
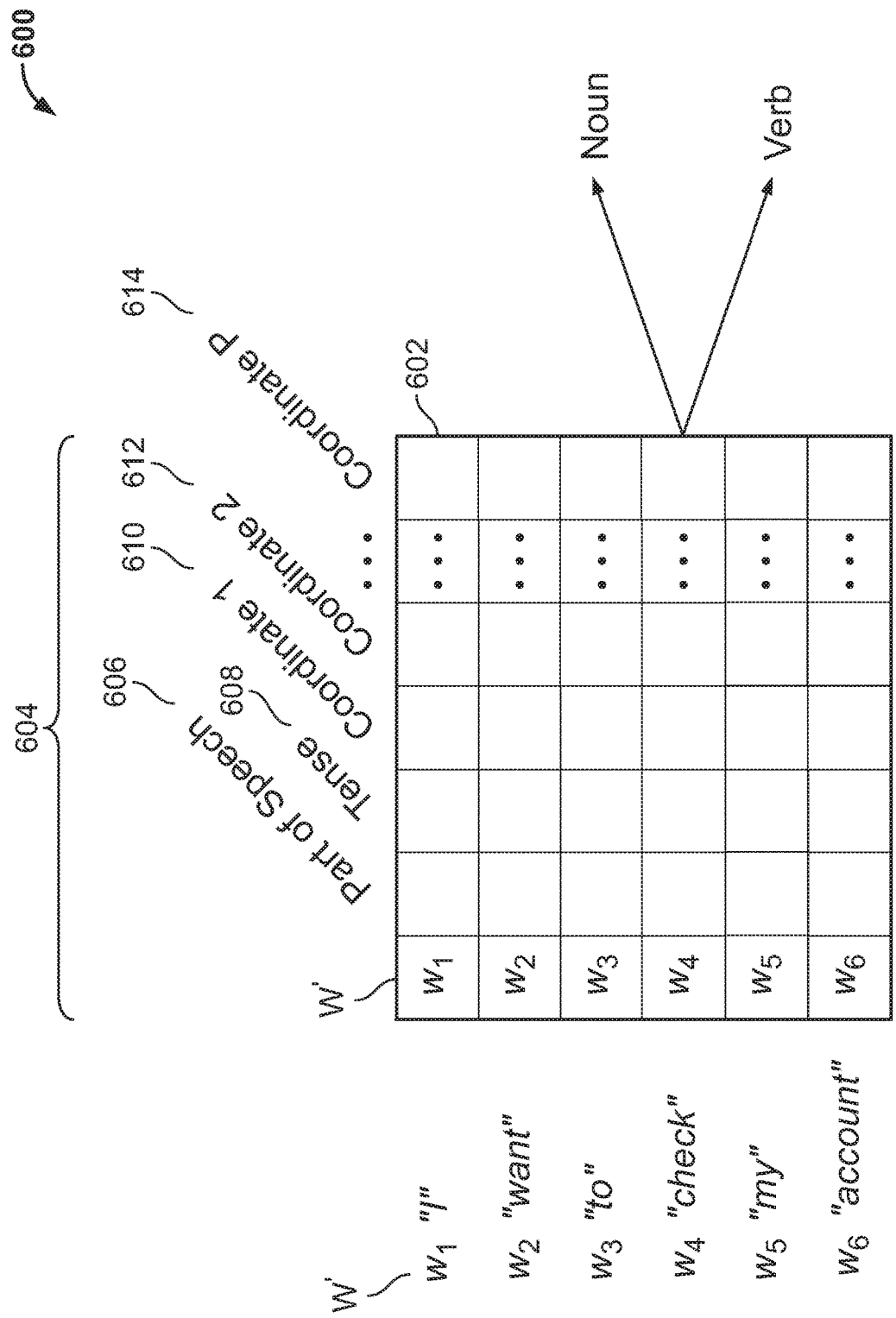
FIG. 6 shows illustrative information in accordance with principles of the invention.

FIG. 6 shows illustrative disambiguation model 600. Model 600 may include language dimension matrix 602. Matrix 602 may include language dimensions associated with each word in sequence W'. Sequence W' is analogous to sequence W (shown in FIG. 3), but has been modified to illustrate disambiguation. Sequence W' includes the word "check," which can have two different meanings. The words of sequence W' may be arranged in matrix 600. Language dimensions 604 are identified across the top of matrix 600. Each of the language dimensions may be populated for each of the $w_i$. Part of speech 606 may correspond to a part of speech such as the parts of speech described and shown in connection with language standard 404 (shown in FIG. 4).

Tense 608 may be one of the various tenses of a language. Table 1 shows illustrative tenses.

TABLE 1

| Illustrative tenses. |
|---|
| Illustrative tenses |
| Past |
| Past Continuous |
| Past Perfect |
| Past Perfect Continuous |
| Present |
| Present Continuous |
| Present Perfect |
| Present Perfect Continuous |
| Future |
| Future Continuous |
| Future Perfect |
| Future Perfect Continuous |
| Other suitable tenses |

Coordinates such as 610, 612 and 614 may be terms or parts of speech that are commonly associated with the $w_i$. For example, "send" may often be followed, within 1-3 words, by "payment" or "money." "Before" may be followed, within 2-5 words, by "month" (as in "the end of the month"). "late fee" may be preceded, within 1-3 words, by "waive." The coordinates may be compared for $w_i$ to $w_{i-n}$ and $w_{i+n}$, where n=1, 2, 3 . . . . Where a comparison shows a strong correspondence, it may suggest or confirm a word sense. Where a comparison shows a weak correspondence or a contradiction, it may reject or disconfirm a word sense. In the example illustrated, the tense 608 and the coordinates are used to select between "check" as a noun and "check" as a verb.

The language dimensions may include denotations. The language dimensions may include connotations.

Figure 7:
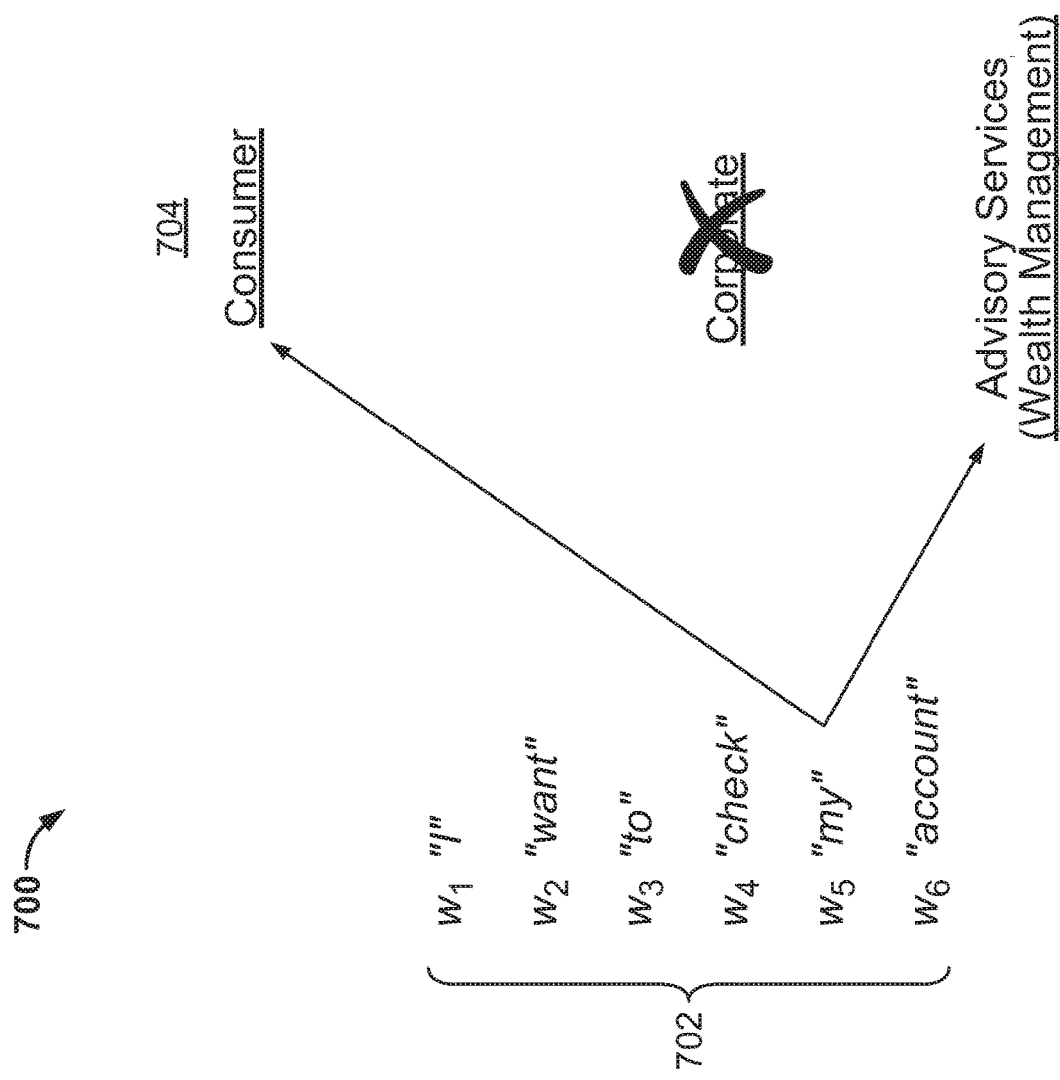
FIG. 7 shows illustrative logic in accordance with principles of the invention.

FIG. 7 shows illustrative context classification tree 700. Inputs 702 to tree 700 may include the $w_i$ of W'. Rules (not shown) may be used to associate a $w_i$, such as $w_5$, with one or more elements in organization division layer 704. Rules (not shown) may be applied to the $w_i$ in the context of the associated element of layer 704 to select a product or service in product/service layer 706. For example the rules may associate, $w_5$, "my," with the element "consumer" and the element "advisory services" in layer 704.

The rules may eliminate "corporate" in layer 704, because "my" is associated with a personal element of layer 704.

FIG. 8 shows illustrative utterance collection process 800, which may be used to break a tie between "consumer" and "advisory services" in layer 704. At step 802, an IVR enunciator may ask the customer, "WOULD THAT BE FOR CONSUMER ACCOUNTS OR ADVISORY SERVICES?" At step 804, an IVR receiver may receive from the customer utterances such as "CONSUMER" and "ACCOUNTS." At step 806, an input engine may parse the utterances into words such as $w_j$.

Figure 9:
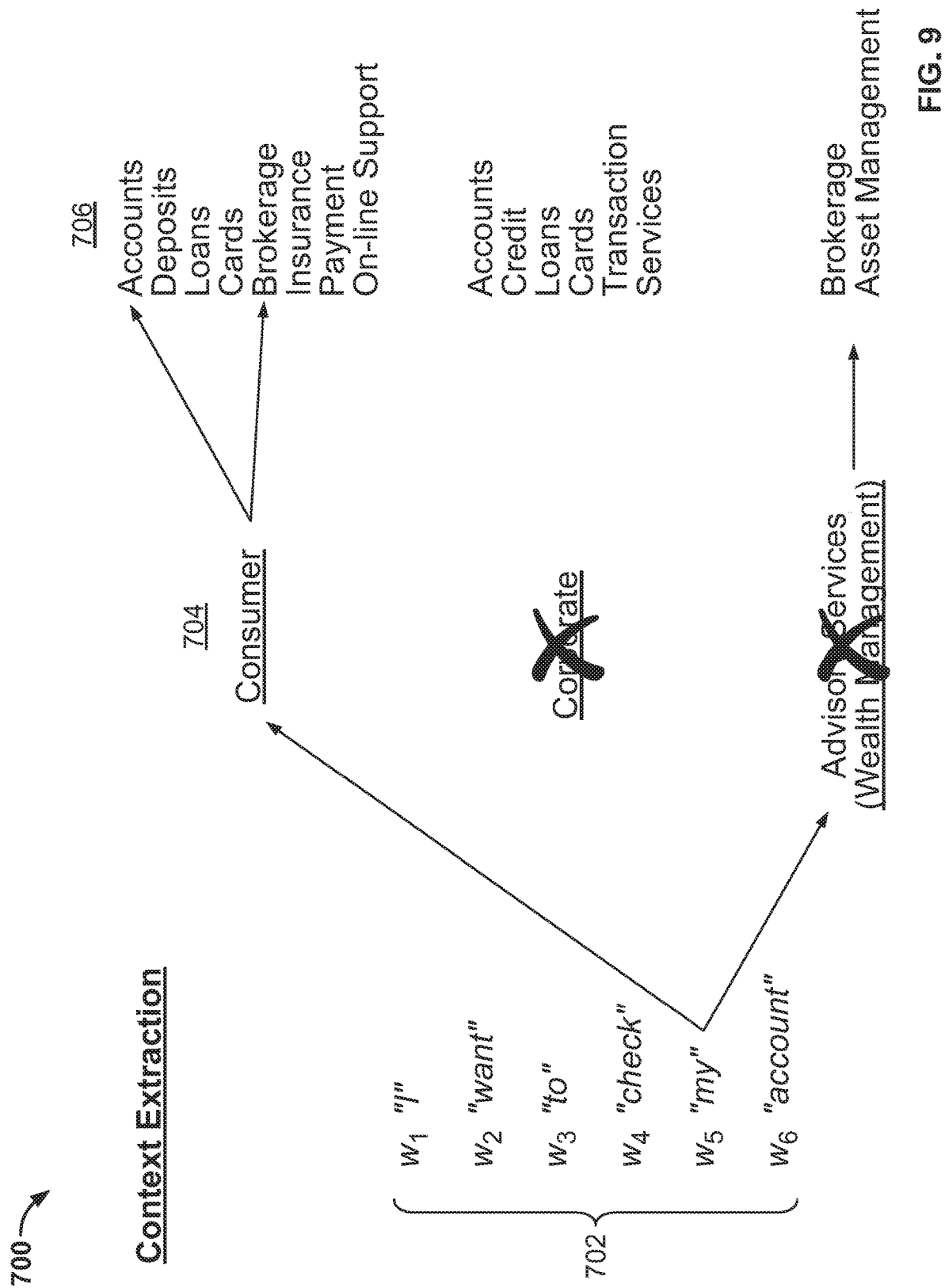
FIG. 9 shows illustrative logic in accordance with principles of the invention.

FIG. 9 shows tree 700 in expanded form, including product/service layer 706. The rules may eliminate "advisory services" in layer 704 based on the outcome of process 800.

Rules (not shown) may be applied to the $w_i$ in the context of the remaining associated element of layer 704 to select a product or service in product/service layer 706. For example the rules may associate, $w_5$, "account," with the element "accounts" and the element "brokerage" in layer 704.

FIG. 10 shows illustrative utterance collection process 1000, which may be used to break a tie between "accounts" and "brokerage" in layer 706 (shown in FIG. 7). At step 1002, an IVR enunciator may ask the customer, "WOULD THAT BE FOR A REGULAR ACCOUNT OR A BROKERAGE ACCOUNT?" At step 1004, an IVR receiver may receive from the customer utterances such as "REGULAR." At step 1006, an input engine may parse the utterances into words such as Wk.

Figure 11:
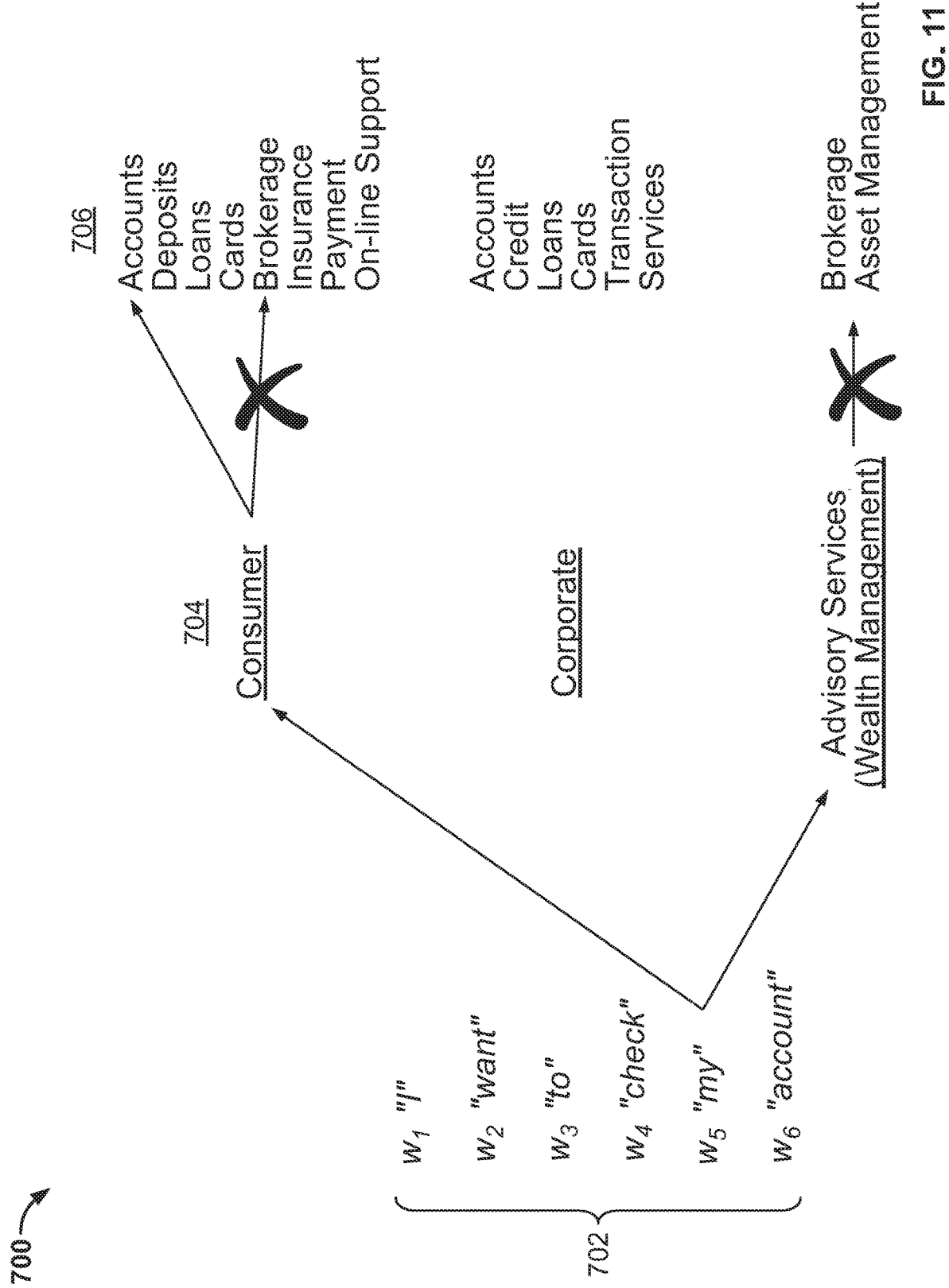

FIG. 11 shows tree 700 in expanded form, including product/service layer 706. The rules may eliminate "brokerage" in layer 706 based on the outcome of process 1000.

Figure 12:
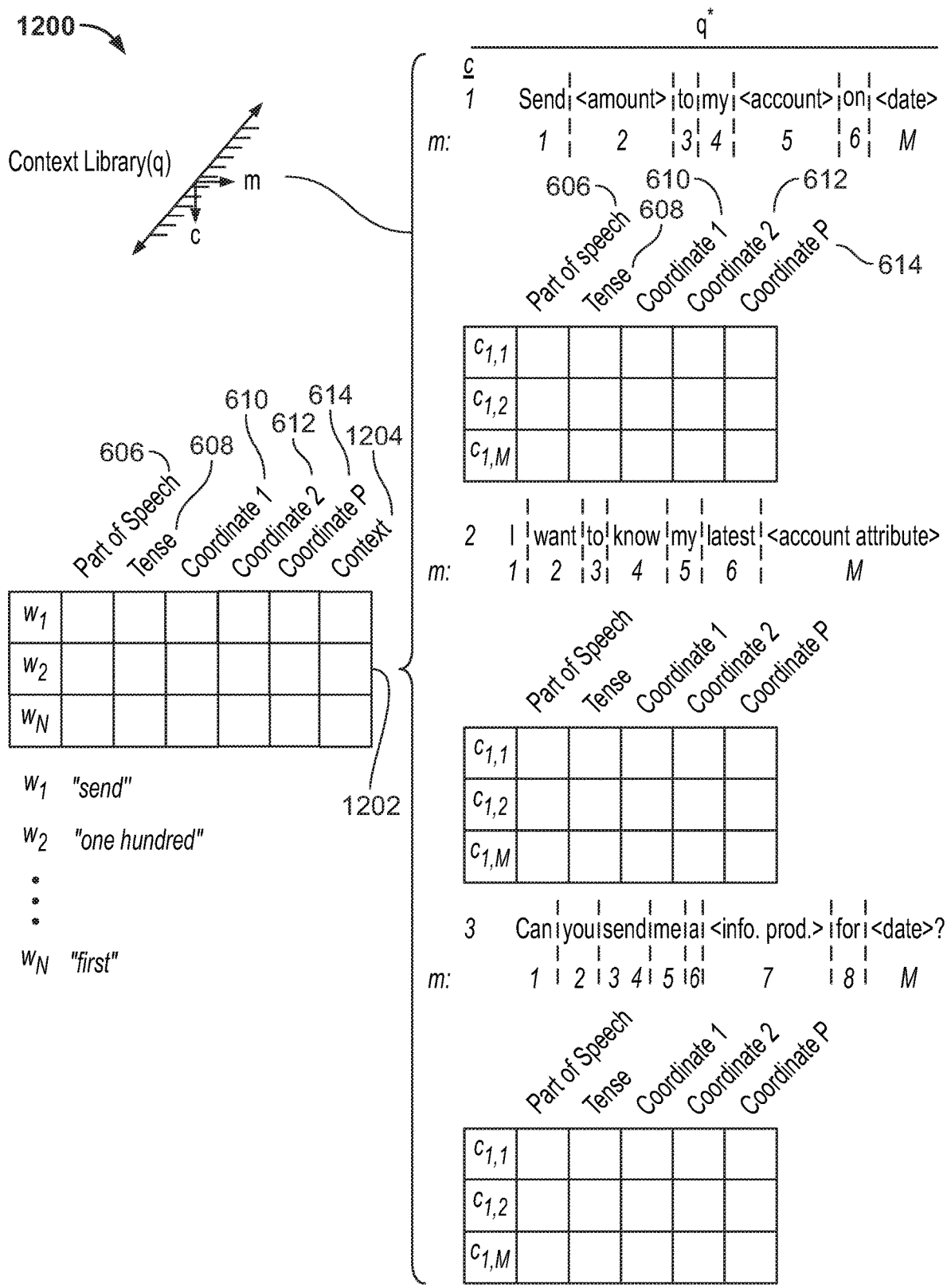
FIG. 12 shows illustrative logic in accordance with principles of the invention.

FIG. 12 shows illustrative canonical phrase selection schema 1200. Sequence W (shown in FIG. 3) is registered in enhanced language dimension matrix 1202. Matrix 1202 may include elements 606, 608, 610, 612 and 614 of matrix 602 (shown in FIG. 6). Matrix 1202 may include context dimension 1204. Context dimension 1204 may be obtained from the output of tree 700 (as shown in FIG. 11). In this example, context, for all $w_i$ in sequence W, may be "accounts," as shown in FIG. 11.

Schema 1200 may include a multidimensional matrix of canonical phrases $c_{p,q}$. Index q corresponds to different context outcomes of a tree such as 700. For each q, schema 1200 may include numerous $c_p$. For hypothetical q=q*, three examples, $c_1$, $c_2$ and $c_3$ are shown. Index m corresponds to the individual words in the canonical phrases.

Linear models may be used to select the canonical phrase c that best matches sequence W based on similarity of the corresponding values of dimensions 606, 608, 610, 612 and 614, for context 1204.

Canonical phrases c may be derived based on permutations 400 (shown in FIG. 4). Bracketed ("<" and ">") terms may be generic terms that are to be replaced by corresponding words $w_i$ from sequence W, after selection of the closest canonical phrase.

Figure 13:
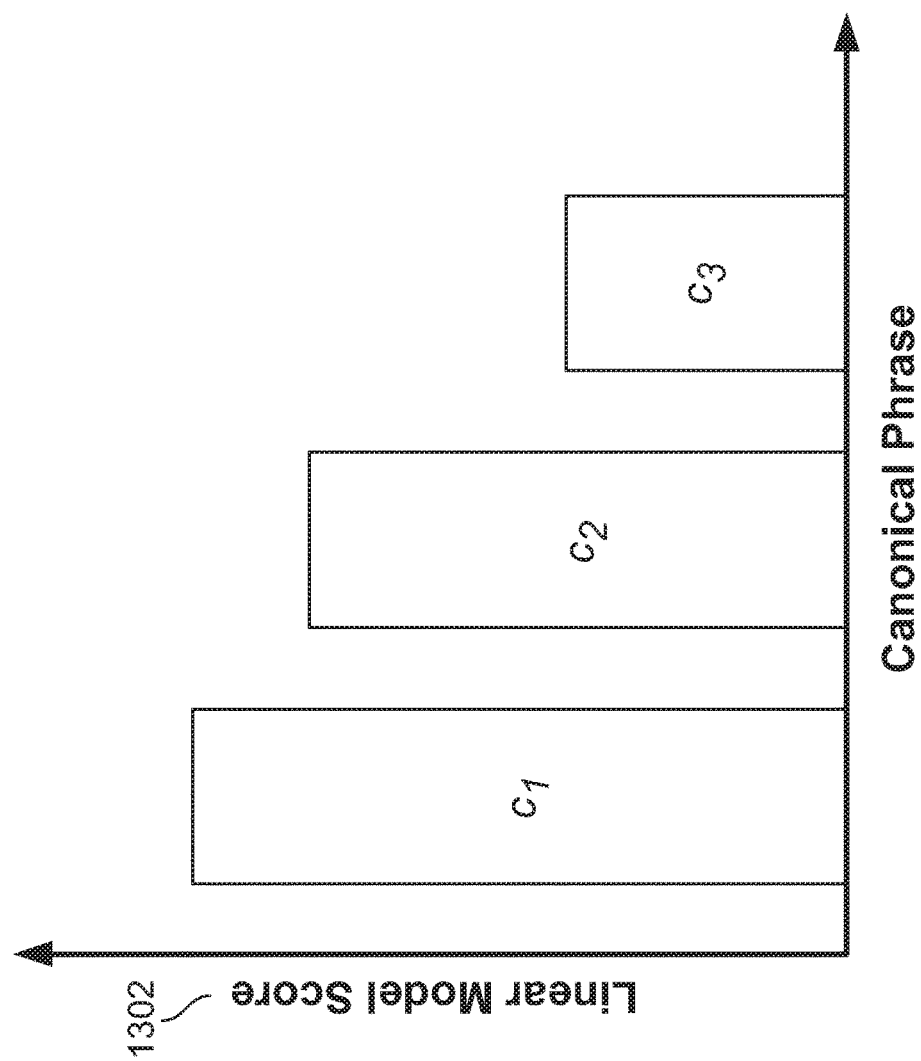
FIG. 13 shows illustrative information in accordance with principles of the invention.

FIG. 13 shows illustrative output 1300 from the application of linear models in schema 1200. Linear model score 1302 may indicate which of the canonical phrases best corresponds to sequence W. In output 1300, canonical phrase $c_1$ is the closest to sequence W.

Figure 14:
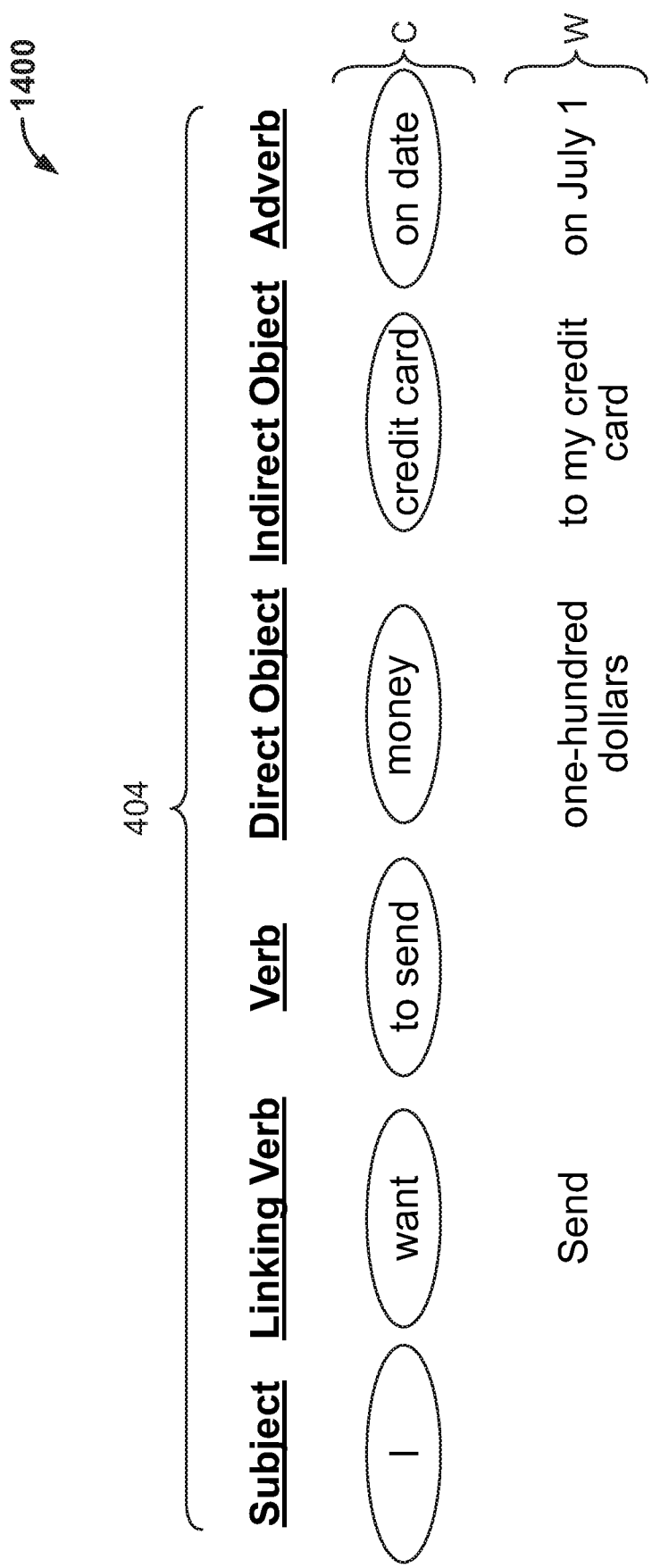
FIG. 14 shows illustrative information in accordance with principles of the invention.

FIG. 14 shows sequence W aligned with best-matching canonical phrase C and language standards 404 (shown in FIG. 4). The circled terms are circled also in FIG. 4 to indicate how the terms were assembled into C. This three-way alignment confirms proper matching of C to W.

FIG. 15 shows arrows that indicate $w_i$ that are to replace elements of C that are generic (bracketed).

FIG. 16 shows hybrid phrase 1600 which combines C terms with the $w_i$ as shown in FIG. 15.

FIG. 17 shows vectorized hybrid phrase X, with elements $x_1, x_2, \ldots, x_t$, which are the output of knowledge extraction engine 302 (shown in FIG. 3).

Figure 18:
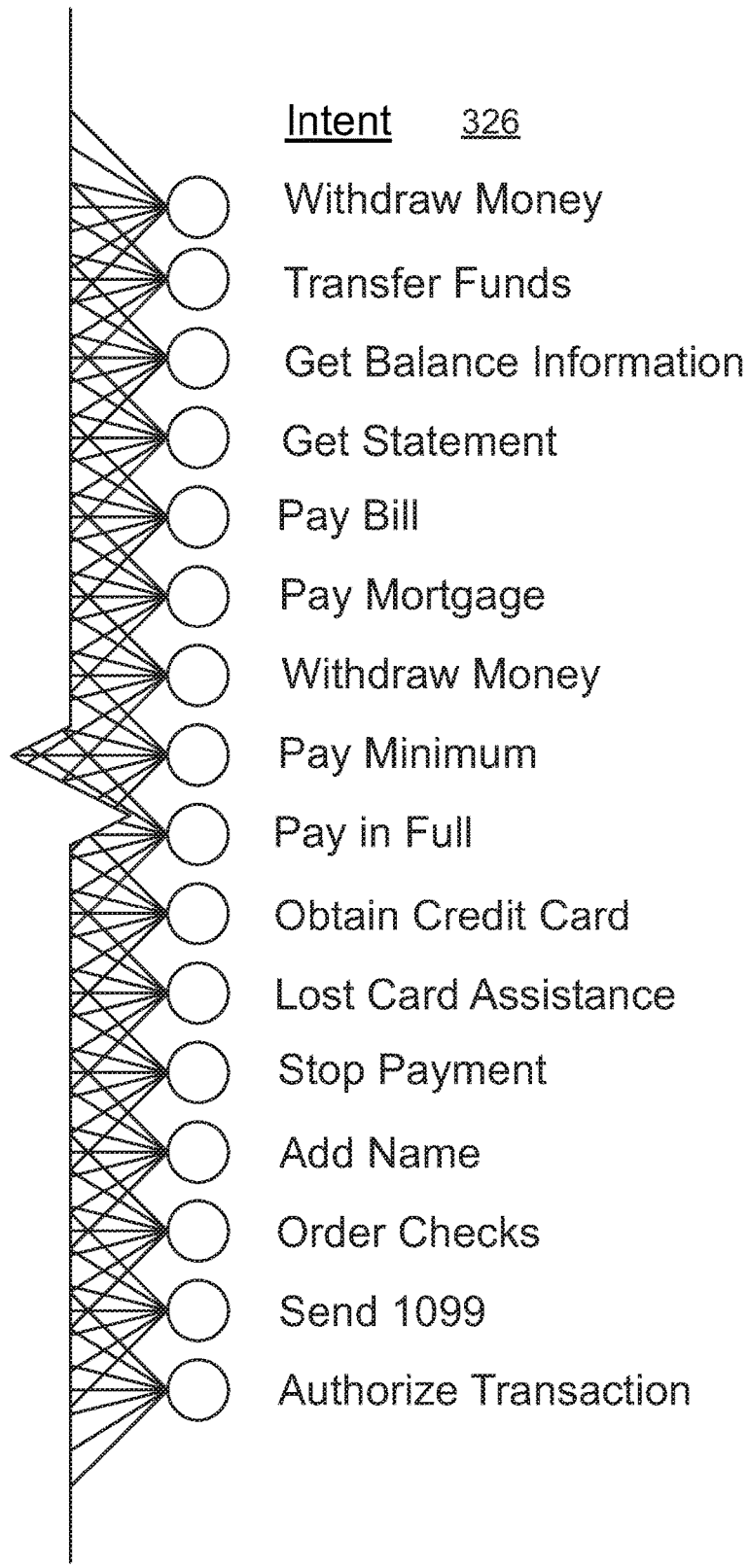
FIG. 18 shows illustrative information in accordance with principles of the invention.

FIG. 18 shows illustrative output layer 1800, corresponding to intents 326 (shown in FIG. 3).

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, apparatus and methods for interactive voice recognition have been provided. Persons skilled in the art will appreciate that the present invention may be practiced by other than the described embodiments, which are presented for purposes of illustration rather than of limitation. The present invention is limited only by the claims that follow.

What is claimed is:

1. Apparatus for interactive voice recognition, the apparatus comprising:
   a canonical phrase derivation engine configured to derive canonical phrases from voice data;
   an input engine configured to parse utterances;
   a knowledge extraction engine configured to:
      disambiguate the utterances into words;
      form a sequence from the words;
      extract context from the sequence;
      pair the sequence with a phrase selected from a set of the canonical phrases that conforms to the context;
      merge the sequence and the phrase to form a hybrid phrase; and
      vectorize the hybrid phrase into a vector; and
   a non-linear classification engine configured to:
      embed the vector into a classifier embedding layer;
      feed output from the embedding layer into a bidirectional long short-term memory layer;
      feed output from the bidirectional long short-term memory layer into a decision layer; and
      determine an intent corresponding to the utterances.

2. The apparatus of claim 1 wherein the knowledge extraction engine is configured to generate a language dimension matrix for the words.

3. The apparatus of claim 2 wherein, when the language dimension matrix is a first dimension matrix, the knowledge extraction engine is further configured to generate for each of the canonical phrases a second language dimension matrix.

4. The apparatus of claim 3 wherein the knowledge extraction engine is configured to:
   apply a linear model to identify the second language dimension matrix that is most similar to the first language dimension matrix; and select a phrase that corresponds to a most similar second language dimension matrix.

5. The apparatus of claim 3 wherein the knowledge extraction engine is further configured to map a word of the sequence to an element of the phrase.

6. The apparatus of claim 5 wherein the knowledge extraction engine is further configured to select for the hybrid phrase, from a word of the sequence and an element of phrase, either the word or the element.

7. The apparatus of claim 5 wherein the knowledge extraction engine is further configured to vectorize the hybrid phrase as input for the non-linear classification engine.

8. An interactive voice recognition method comprising:
deriving canonical phrases from voice data;
digitally parsing utterances;
disambiguating the utterances into words;
forming a sequence from the words;
extracting context from the sequence;
pairing the sequence with a phrase selected from a set of the canonical phrases that conforms to the context;
merging the sequence and the phrase to form a hybrid phrase;
vectorizing the hybrid phrase into a vector;
embedding the vector into a classifier embedding layer;
feeding output from the embedding layer into a bidirectional long short-term memory layer;
feeding output from the bidirectional long short-term memory layer into a decision layer; and
determining an intent corresponding to the utterances.

9. The method of claim 8 wherein the disambiguation includes forming a language-dimension matrix corresponding to the utterances.

10. The method of claim 9 wherein the matrix includes a part-of-language parameter.

11. The method of claim 9 wherein the matrix includes a tense parameter.

12. The method of claim 9 wherein the matrix includes a coordinating term parameter.

13. The method of claim 8 wherein the extracting includes a products and services tree.

14. The method of claim 13 wherein the extracting includes a tie-breaking intervention by an automated attendant.

15. The method of claim 8 wherein the pairing includes generating a language dimension matrix for the words.

16. The method of claim 15 wherein, when the language dimension matrix is a first dimension matrix, the pairing further includes generating for each of the canonical phrases a second language dimension matrix.

17. The method of claim 16 wherein;
the pairing includes using a linear model to identify the second language dimension matrix that is most similar to the first language dimension matrix; and
selecting a phrase that corresponds to a most similar second language dimension matrix.

18. The method of claim 16 wherein the merging includes mapping a word of the sequence to an element of the phrase.

19. The method of claim 18 further comprising selecting for the hybrid phrase, from a word of the sequence and an element of phrase, either the word or the element.

20. The method of claim 18 further comprising vectorizing the hybrid phrase.

* * * * *